(12) United States Patent
Ferry et al.

(10) Patent No.: US 10,046,594 B1
(45) Date of Patent: Aug. 14, 2018

(54) DECORATIVE DECAL ASSEMBLY FOR A WEIGHT PLATE

(71) Applicants: Keith George Ferry, Burbank, CA (US); Jason Michael Busch, Los Angeles, CA (US)

(72) Inventors: Keith George Ferry, Burbank, CA (US); Jason Michael Busch, Los Angeles, CA (US)

( * ) Notice: Subject to any disclaimer, the term of this patent is extended or adjusted under 35 U.S.C. 154(b) by 152 days.

(21) Appl. No.: 14/790,677

(22) Filed: Jul. 2, 2015

Related U.S. Application Data

(60) Provisional application No. 62/020,606, filed on Jul. 3, 2014.

(51) Int. Cl.

| | | |
|---|---|---|
| B44C 1/10 | (2006.01) |
| A63B 21/06 | (2006.01) |
| A63B 21/075 | (2006.01) |
| A63B 21/072 | (2006.01) |
| B32B 3/00 | (2006.01) |
| B32B 27/38 | (2006.01) |
| B32B 27/36 | (2006.01) |
| B32B 27/40 | (2006.01) |

(52) U.S. Cl.
CPC .............. *B44C 1/105* (2013.01); *A63B 21/06* (2013.01); *A63B 21/072* (2013.01); *A63B 21/075* (2013.01); *A63B 21/0728* (2013.01); *B32B 3/00* (2013.01); *B32B 27/36* (2013.01); *B32B 27/38* (2013.01); *B32B 27/40* (2013.01); *Y10T 428/2852* (2015.01)

(58) Field of Classification Search
CPC . A63B 21/072; A63B 21/0728; A63B 21/075; B32B 3/00; B32B 27/36; B32B 27/38; B32B 27/40; Y10T 428/2852
See application file for complete search history.

(56) References Cited

U.S. PATENT DOCUMENTS

| | | |
|---|---|---|
| 4,461,795 A | 7/1984 | Ogawa |
| 5,300,164 A | 4/1994 | DeTrano et al. |
| 6,030,676 A | 2/2000 | Cottin et al. |
| 6,080,465 A | 6/2000 | Boissonnet et al. |
| 6,235,376 B1 | 5/2001 | Miyazaki et al. |
| 6,391,134 B1 | 5/2002 | Lipovac |
| 7,387,144 B2 | 6/2008 | Byrne |
| 8,834,974 B1 | 9/2014 | Ferry et al. |
| 2003/0099827 A1* | 5/2003 | Shih .................. B32B 7/12 428/343 |

(Continued)

*Primary Examiner* — Betelhem Shewareged
(74) *Attorney, Agent, or Firm* — Snell & Wilmer L.L.P.

(57) ABSTRACT

The decorative decal assembly (20) is configured to be secured within a recessed surface (26) of a weight plate (18) and includes an adhesive layer (36), a printable surface (44) of an adjacent ink protective printing layer (42), and one or more print decals (48) secured to the printable surface (44) and between an upper support surface (40) of the adhesive layer (36) and the ink protective layer (42). The recessed surface (26) defines a display area (56) surrounded on all sides by an expansion zone (58) extending between the display area (56) and the shoulders (30, 32) of the weight plate (18) that define the recessed surface (26) to permit limited expansion of perimeter edges (62A, 62B) of the decal assembly (20) into the expansion zone (58) without contacting the shoulders (30, 32) whenever the weight plate (18) experiences a bounce shock.

13 Claims, 2 Drawing Sheets

(56) References Cited

U.S. PATENT DOCUMENTS

| | | | |
|---|---|---|---|
| 2003/0104154 A1* | 6/2003 | Brandt | G09F 3/10 |
| | | | 428/40.1 |
| 2005/0054496 A1* | 3/2005 | Harms | A63B 21/0726 |
| | | | 482/106 |
| 2006/0075910 A1* | 4/2006 | Cao | B41M 7/0027 |
| | | | 101/129 |
| 2010/0092716 A1 | 4/2010 | Spychalsky | |

* cited by examiner

DECORATIVE DECAL ASSEMBLY FOR A WEIGHT PLATE

CROSS-REFERENCE TO RELATED APPLICATION

This Application claims the benefit of U.S. Provisional Patent Application Ser. No. 62/020,606 that was filed on 3 Jul. 2014 entitled "Decorative Decal Assembly For A Weight Plate".

TECHNICAL FIELD

This disclosure relates to a decorative decal for weight plates used in resistance training, weight lifting, etc., and especially relates to a decorative decal assembly for application within a recessed surface of a weight plate.

BACKGROUND ART

It is well known that weight plates receive applications of trademarks, logos and other indicia of marketing value and for purposes of indicating the load of the plate as well as indicating special events. Known, modern weight plates are being used such as in Olympic competition or "CROSSFIT" training. ("CROSSFIT" is a registered trademark of Cross-Fit, Inc., a Delaware Corporation.) It is increasingly common that standardized weight plates are utilized in such competition and fitness training. The standardized plates are almost invariably circular and they typically are made of a compressible material, such as all rubber, or a composite of a rubber outer plate with a central steel sleeve for mounting to a bar. Some weight plates are also made of solid metals. Such standardized weight plates typically include a recessed surface wherein a weight of the plate, such as in pounds ("lb."), trademarks, logos, design images and/or special event advertising is placed.

The traditional methods of applying decorative designs, trademarks, etc. to weight plates include screen printing directly to the surface of the plate, painting the plate surface or creating raised lettering during the manufacturing process of the plates. In the circumstance of the standardized rubber weight plates (also known as "bumper plates"), the application of the decorative designs is typically done by screen printing or creating raised rubber letters during the vulcanization process of manufacturing the rubber bumper plates.

Regardless of the manufacturing process, customized application of decorative designs, trademarks, etc. is limited due to inefficiency in low batch quantities of manufacture of the weight plates and is therefore basically cost prohibitive. In addition, application of decorative design techniques such as screen printing often is insufficiently durable for periods of time as well as susceptible to degradation from ultra violet light and chemical exposure which are common in weight lifting environments.

Therefore, manufacturers and customers have sought solutions to remedy the aforementioned challenges. One form of modern weight plates has integrated a recessed surface on one or both sides of the plate. As shown in the prior art FIG. 1 of a contemporary weight plate 10, a recessed surface 12 is defined to be essentially co-axial with a central axis 13 of the circular plate 10, and markings 14 are located on a support surface 16 of the recessed surface 12. In the FIG. 1 prior art weight plate 10, the markings are the weight ("35 LB") of the plate 10. This prevents the markings 14 from being scratched or otherwise damaged during stacking and/or loading of the weight plates 10 onto each other or onto a weight bar (not shown). Nonetheless, such use of the recessed surface 12 still leaves the markings 14 subject to substantial wear and tear. The known methods of placing or defining markings 14 on the recessed surface 12 are quite expensive, especially for limited production of the plates 10 and for a requirement for plates 10 of many different weight markings 14.

Consequently, there is still a need to provide an efficient decorative assembly and method of use for securing markings such as weights of the plates, custom brand names, branding, decorative designs, trademarks, etc. to weight plates in a cost effective manner at low quantities as well as in a scale for large batch production. In addition, there is a need to supply decorative designs to weight plates wherein the designs have adequate durability to resist ultra-violet radiation ("UV") and chemical exposure as well as wear and tear typical to the weight lifting environments.

SUMMARY OF THE DISCLOSURE

The present disclosure is a decorative decal assembly for a weight plate, wherein the weight plate includes a first side and an opposed second side, and also includes a recessed surface that is defined within at least one of the first side and the second side of the plate. The recessed surface extends between shoulders defined within the side of the plate. The shoulders descend below an exterior surface of the side of the weight plate to surround and thereby define the recessed surface.

The decorative decal assembly includes an adhesive layer that has a contact surface and an opposed support surface. An ink protecting printable layer has a printable surface that is secured to the support surface of the adhesive layer, and the ink protecting printable layer also has an opposed outer protective surface. At least one ink decal is secured to the printable surface of the ink protecting printable layer so that the ink decal and the printable surface are adjacent and secured to the support surface of the adhesive layer. The recessed surface defines a display area surrounded on all sides by an expansion zone extending between the display area and the shoulders of the weight plate that define the recessed surface. The expansion zone extends a sufficient distance between perimeter edges of the display area and the shoulders defining the recessed surface to permit limited expansion of perimeter edges of the decal assembly into the expansion zone without any perimeter edge of the decal assembly contacting the shoulders defining the recessed surface whenever the weight plate experiences a bounce shock. (For purposes herein, the phrase "bounce shock" is to mean the impact shock experienced by weight plates when at least one weight plate is secured to opposed ends of a horizontal weight bar, and a weight lifter drops the bar from no higher than about ten feet, and the weight plates drop by gravity to a supporting platform to impact the platform and stop their downward motion. The sudden stop of the weight plates having their display surfaces about vertical to the platform produces the "bounce shock".) Additionally, the contact surface of the adhesive layer of the decal assembly contacts, is adhered to and completely overlies the display area of the recessed surface. Also, the ink protecting printable layer of the decal assembly also completely overlies the display area of the recessed surface.

In differing embodiments, the decorative decal assembly may be in a specific form to match and completely overlie the display area of a recessed surface of a weight plate wherein the recessed surface is in the form of a co-axial circle, such as for example when the weight plate is circular.

The recessed surface may also be in the form of an arbitrarily shaped marking portion of the side of the weight plate. Moreover, the weight plate may include recessed surfaces on both sides of the plate. Additionally, the components of the decorative decal assembly described in more detail below may include specific formulations varying in form of adhesives, inks, layer substrates, including at least all such components known to be used in applying markings to rubber, plastic or metal surfaces. For example, the "ink decal" may be a spray or coating of ink onto the printable surface of the ink protecting printable layer, such as ink sprayed by a digital plotter printer, or known "ink-jet" technology; "laser-ink" application technology, or spread through screen or flexographic printing, etc.

The disclosure also includes methods of forming the decorative decal and applying it to the recessed surface area of the weight plate.

In further embodiments, the ink decals may be applied, such as by ink sprays or coatings, in segments along the printable surface of the ink protecting printable layer, may be applied to completely overlie the printable surface including solid ink or clear ink segments between colored ink segments, may be applied in several colors in adjacent or overlapping segments, or may be applied in several colors in stacked overlying layers including adjacent color segments in the overlying layers secured to the printing surface of the ink protecting surface layer.

In another embodiment, the expansion zone has an average distance between a perimeter edge of the display area and the shoulder of the recessed surface of between about 1 millimeter ("mm") and 5 mm. (For purposes herein the word "about" is to mean plus or minus twenty percent.)

Accordingly, it is a primary purpose of the present disclosure to provide a decorative decal assembly for a weight plate and a method of manufacture of the assembly that overcomes deficiencies of the prior art; that is more durable, less expensive, and easier to make and use than known production of, and application of, markings on weight plates. These and other advantages purposes of the present disclosure will become apparent when the following description is read along with the accompanying drawings.

DETAILED DESCRIPTION OF THE PREFERRED EMBODIMENTS

Figure 1:
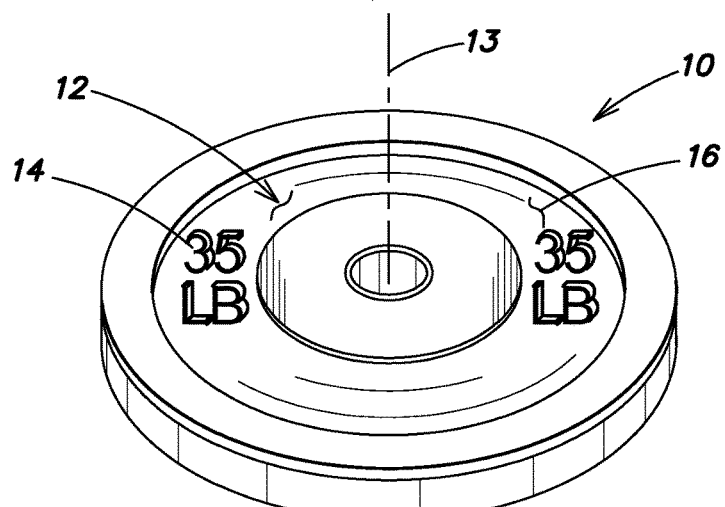
FIG. 1 is a perspective view of prior art weight plate showing a circular recessed surface that is co-axial with a central axis of the weight plate.
Figure 2:
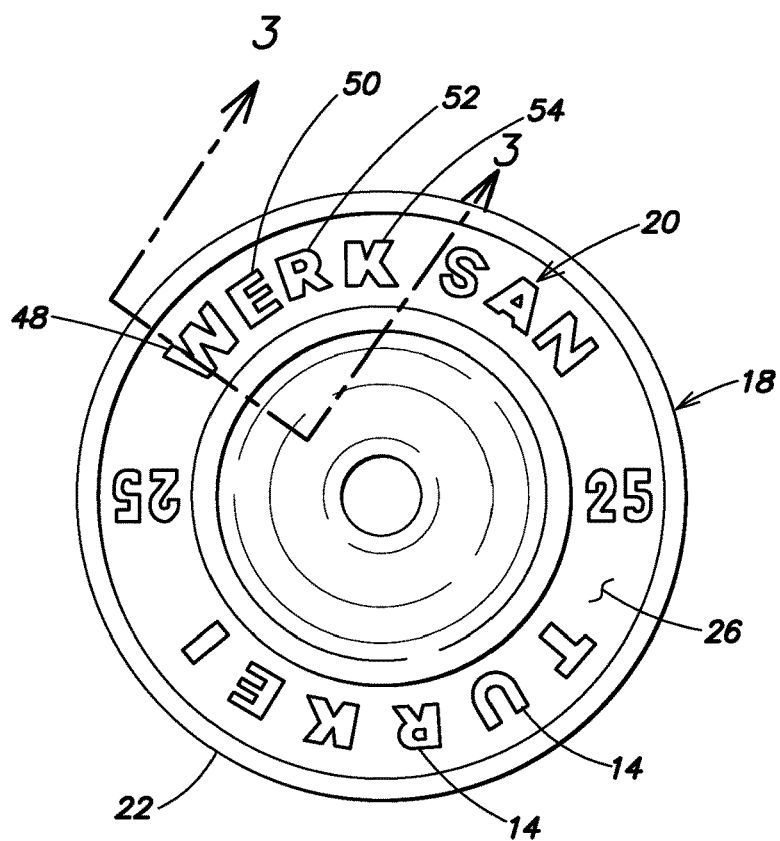
FIG. 2 is weight plate having a decorative decal assembly secured within a recessed surface on a side of the weight plate and constructed in accordance with the present disclosure.
Figure 3:
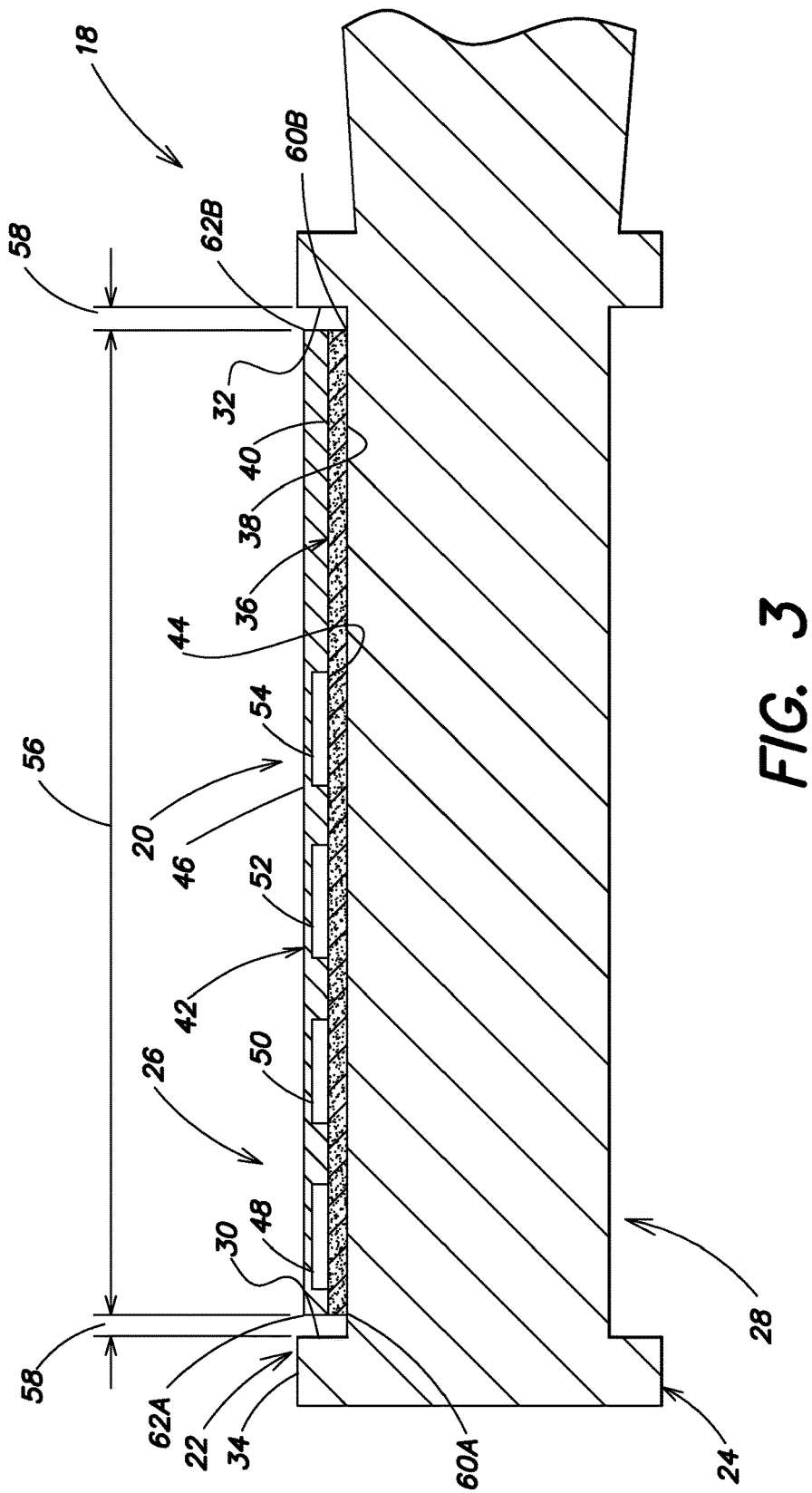
FIG. 3 is a fragmentary, cross-sectional view taken along sight line 3-3 of FIG. 2.

Referring to the drawings in detail a decorative decal assembly for a weight plate 18 is shown in FIGS. 2 and 3, and is generally designated by the reference numeral 20. The weight plate 18 includes a first side 22 and an opposed second side 24, and also includes a recessed surface 26 that is defined within the first side 22. A second recessed surface 28 is defined in the second side 24 of the weight plate 18. The recessed surface 26 extends between a first shoulder 30 and a second shoulder 32 defined within the first side 22 of the plate. The shoulders 30, 32 descend below an exterior surface 34 of the first side 22 of the weight plate 18 to surround and thereby define the recessed surface 26.

The decorative decal assembly 20 includes an adhesive layer 36 that has a contact surface 38 and an opposed support surface 40. The adhesive layer 36 may be made of a pressure sensitive adhesive such as acrylic adhesive designed for applications requiring clarity, high shear, permanent tack, and chemical resistance. One such permanent acrylic adhesive is Part #TT-V29 from FLEXcon located in Spencer, Mass. or Structured 350 Adhesive from 3M Company which is designed to prevent air bubble formulation when laminated or applied to surfaces. Additional adhesives include but are not limited to other acrylic, polyurethane-based pressure sensitive adhesives, thermosetting adhesives, epoxy or similar chemical cure adhesives and the like capable of bonding sufficiently to withstand impact and use commonly experienced by the weight plate.

An ink protecting printable layer 42 has a printable surface 44 that is secured to the support surface 40 of the adhesive layer 36. The ink protecting printable layer 42 also has an opposed outer protective surface 46. The ink protecting printable layer 42 must be made of a material capable of withstanding the bounce shock associated with weight plate 18 activity; mechanical stress and deformation experienced by the weight plate 18; resistance to ultra-violet light ("UV" light) and other chemical exposure; as well as resistant to abrasion. One such material is a layer 42 of high strength polyurethane film part number EU94DS available from Smith and Nephew Extruded Films of East Yorkshire, England. Other comparable materials including polyester, urethane and thermoplastic polyurethane ("TPU") films, high flex vinyl and comparable printable films. Experiments by the present inventors have established that the layer 42 should optimally have a thickness that is ideally between about 80 microns and about 150 microns thick, which is of sufficient thickness to withstand abrasive forces experienced by the weight plate. (For purposes herein, the word "thickness" is to mean a shortest distance between opposed outer surfaces of the printable layer.) For weight plates requiring additional durability and related specific conditions (e.g. exclusively outdoor, ocean-beach usage), the ink protecting printable layer 42 may have a thickness between about 50 microns to about 300 microns, depending on a predetermined specific application for the weight plate 18.

At least one, or a first ink decal 48 is secured to the printable surface 44 of the ink protecting printable layer 42 so that the ink decal 48 and the printable surface 44 are adjacent and secured to the support surface 40 of the adhesive layer 36. FIG. 3 shows a second ink decal 50 displaced away from the first ink decal 48; a third ink decal 52 similarly displaced away from the second ink decal 50; and, a fourth ink decal 54 positioned away from the third ink decal 52. These four ink decals 48, 50, 52, 54 represent the markings 14 shown in FIG. 2, wherein only the leading edges of the four ink decals 48, 50, 52, 54 are seen in the FIG. 3 fragmentary, cross-sectional view taken along sight line 3-3 of FIG. 2. By the phrase "ink decal 48", it is to be understood that the ink decal 48 may include a spray of ink 48 onto the printable surface 44 of the ink protecting printable layer 42, such as ink sprayed by a digital plotter printer, or "ink-jet" technology; "laser-ink" application technology; chemical etching, screen printing, flexographic printing or any process known for applying a light-reflective, highly elastomeric ink substance to the printable surface 44 of the ink protecting printable layer 42. The ink decal 48 should be curable via ambient conditions or other techniques such as application of UV light or heat exposure so as to remove any solvent medium, which is often water or volatile, solvent-based compounds. One such ink 48 that may be selected is silkscreen 800 series ink from Union Process of Akron Ohio. It is important to select an ink 48 material which will not fade, discolor or degrade when exposed to conditions such as UV light, heat or other factors and also must be sufficiently elastomeric to withstand mechanical stress and deformation commonly experienced by the weight plate, and identified herein as "bounce shock".

The recessed surface 26 defines a display area 56 surrounded on all sides by an expansion zone 58 extending between the display area 56 and the shoulders 30, 32 of the weight plate 18 that define the recessed surface 26. The expansion zone 58 extends a sufficient distance between perimeter edges 60A, 60B of the display area 56 and the shoulders 30, 32 defining the recessed surface 26 to permit limited expansion of perimeter edges 62A, 62B of the decal assembly 20 into the expansion zone 58 without any perimeter edge 62A, 62B of the decal assembly 20 contacting the shoulders 30, 32 defining the recessed surface 26 whenever the weight plate 18 experiences a bounce shock. Additionally, the contact surface 38 of the adhesive layer of the decal assembly 20 contacts, is adhered to and completely overlies the display area 56 of the recessed surface. The ink protecting printable layer 42 of the decal assembly 20 also completely overlies the display area 56 of the recessed surface 26.

It is to be understood that, the decorative decal assembly 20 may be in a specific planar, geometric form to match and completely overlie the display area 56 when the display area takes the shape of a variety of forms. For example, the recessed surface 26 of the weight plate 18 may be in the shape of a co-axial partial or full circle, such as for example when the weight plate 18 is circular having a circular outer perimeter, as shown in FIG. 2. The recessed surface 26 may also be in the form of an arbitrary shape either side 22, 24 of the weight plate 18. Moreover, the weight plate 18 may include a plurality of recessed surfaces 26, 28 on both sides 22, 24 of the plate 18.

In further embodiments, the ink decals 48, 50, 52, 54 may be applied such as by ink sprays or coating, in segments 48, 50, 52, 54 along the printable surface 44 of the ink protecting printable layer 42. The ink decals 48, 50, 52, 54, may be applied to completely overlie the printable surface 44 to also overlie the display area 56 of the recessed surface 26, including, for example solid ink or clear ink segments (not shown) between colored ink segments 48, 50, 52, 54, that may be applied in several colors in adjacent or overlapping segments (not shown). Additionally, the ink decals 48, 50, 52, 54 may be applied in several colors in stacked overlying layers (not shown) of decals 48, 50, 52, 54, wherein each layer includes adjacent color segments within the overlying layers secured to the printing surface 44 of the ink protecting surface layer 42. It is to be understood that additional protective layers 42 with or without print decals attached thereto (not shown) may be applied to further protect the ink decals 48, 50, 52, 54, and that the decorative decal assembly 20 may also include many layers of the ink decals 48, 50, 52, 54 secured between the printable surface 44 of the ink protective printable layer 42 and support layer 40 of the adhesive layer 36.

In some embodiments, the expansion zone 58 has an average distance between a perimeter edge 60A, 60B of the display area 56 and the shoulders 30, 32 of the recessed surface 26 of between about 1 millimeter ("mm") and 5 am. (For purposes herein the word "about" is to mean plus or minus twenty percent.)

The disclosure also includes methods of forming the decorative decal assembly 20 and applying the assembly 20 to the recessed surface area 26 of the weight plate 18. An exemplary method includes the steps of first applying and securing ink decals 48, 50, 52, 54 to the printable surface 44 of the ink protecting printable layer 42; then securing the printable surface 44 of the layer 42 to the support surface 40 of the adhesive layer 36; and then securing the contact surface 38 of the adhesive layer 36 to the display area 56 of the recessed surface 26. This method may also include calibrating ink applicators (not shown) to spay or coat ink decals 48, 50, 52, 54 within a predetermined area or areas on the printable surface 44 of the ink protecting printable layer 42 that completely overlie a predetermined area or areas of the display area 56. The method may also include use of standard release liners (not shown) applied to the contact surface 38 of the adhesive layer 36 so that the decal assembly may be safely stored and transported prior to application to the recessed area 26 and the weight plate 18, wherein the release liner (not shown) is peeled away from the contact surface 38 of the adhesive layer 36 prior to application of the decal assembly 20 to the display area 56. (It is to be understood that a "release liner" (not shown) is very common in adhesive applications, such as liners pulled away from U.S. Mail "Express Mail" envelope labels prior to applying the uncovered adhesive on the label to close the envelope. Hence, a "release liner" is neither shown in the Figures nor claimed.)

The disclosure also includes the aforesaid methods of forming the decorative decal assembly 20 and applying it to the recessed surface area of the weight plate, along with other known methods of applying layered decorative decal assemblies 20 to rubber and/or plastic surfaces.

While the present disclosure has been presented above with respect to the described and illustrated embodiments of the decorative decal assembly 20 for a weight plate 21, it is to be understood that the disclosure is not to be limited to those alternatives and described embodiments. Accordingly, reference should be made primarily to the following claims rather than the forgoing description to determine the scope of the disclosure.

What is claimed is:

1. A decorative decal assembly for a weight plate, the weight plate including a first side and an opposed second side, a recessed surface being defined within at least one of the first side and the second side, and the recessed surface extending between shoulders defined within at least one of the first side and the second side, wherein the shoulders descend below an exterior surface of the at least one of the first side and the second side of the weight plate to surround and thereby define the recessed surface, the decorative decal assembly comprising:

a. an adhesive layer having a contact surface and an opposed support surface;
  b. an ink protecting printable layer having a printable surface secured to the support surface of the adhesive layer and an opposed outer protective surface;
  c. at least one ink decal secured to the printable surface of the ink protecting printable layer and in contact with the support surface of the adhesive layer;
  d. wherein the recessed surface defines a display area surrounded on all sides by an expansion zone extending between the display area and the shoulders of the weight plate that define the recessed surface, and wherein the expansion zone extends between perimeter edges of the display area and the shoulders a sufficient distance to permit limited expansion of perimeter edges of the decal assembly into the expansion zone without contacting the shoulders defining the recessed surface whenever the compressible weight plate experiences a bounce shock; and, e. wherein the contact surface of the adhesive layer of the decal assembly contacts, is adhered to and completely overlies the display area of the recessed surface, and wherein the ink protecting printable layer of the decal assembly also completely overlies the display area of the recessed surface.

2. The decorative decal assembly of claim 1, wherein an average distance between a perimeter edge of the display area and the shoulders defining the recessed surface is between about 1 millimeter and about 5 millimeters.

3. The decorative decal assembly of claim 1, wherein the weight plate is circular, and the recessed surface is in the form of one of a partial circle and a full circle co-axial with an outer perimeter of the circular weight plate.

4. The decorative decal assembly of claim 1, wherein the adhesive layer comprises a permanent acrylic adhesive.

5. The decorative decal assembly of claim 1, wherein the adhesive layer comprise an adhesive layer selected from the group consisting of polyurethane-based pressure sensitive adhesives, thermosetting adhesives, and epoxy adhesives.

6. The decorative decal assembly of claim 1, wherein the ink protecting printable layer comprises a polyurethane film.

7. The decorative decal assembly of claim 1, wherein the ink protecting printable layer comprises a layer selected from the group consisting of polyester, urethane, thermoplastic polyurethane, and flexible vinyl films.

8. The decorative decal assembly of claim 1, wherein the ink protecting printable layer has a thickness, being a shortest distance between opposed outer surfaces of the printable layer of between about 80 microns and about 150 microns.

9. The decorative decal assembly of claim 1, wherein the ink protecting printable layer has a thickness, being a shortest distance between opposed outer surfaces of the printable layer, of between about 50 microns and about 300 microns.

10. A method of forming the decorative decal assembly of claim 1 and applying the assembly to a recessed surface of a weight plate, the weight plate including a first side and an opposed second side, a recessed surface being defined within at least one of the first side and the second side, and the recessed surface extending between shoulders defined within at least one of the first side and the second side, wherein the shoulders descend below an exterior surface of the at least one of the first side and the second side of the weight plate to surround and thereby define the recessed surface, the method of forming the decorative decal assembly and applying the decorative decal assembly to the recessed surface area of the weight plate comprising:

a. applying and securing at least one ink decal to a printable surface of an ink protecting printable layer;

b. then securing the printable surface of the ink protecting printable layer to a support surface of an adhesive layer, the adhesive layer having an opposed contact surface;

c. defining a display area upon the recessed surface and defining an expansion zone surrounding all perimeter edges of the display area so that the expansion zone extends a sufficient distance between the perimeter edges of the display area and the shoulders defining the recessed surface to permit limited expansion of perimeter edges of the decal assembly into the expansion zone without any perimeter edge of the decal assembly contacting the shoulders defining the recessed surface whenever the weight plate experiences a bounce shock;

d. cutting the combined ink protecting printable layer and the adhesive layer secured to the printable layer to completely overlie the display area defined upon the recessed surface and to remain within perimeter edges of the display area; and, e. then, securing and adhering the contact surface of the adhesive layer to overlie the display area on the recessed surface.

11. The method of claim 10, wherein applying and securing the at least one ink decal to the printable surface of the ink protecting printable layer further comprises applying the ink decal through use of one of a digital ink plotter, screen printing, and flexographic printing.

12. The method of claim 11, wherein applying and securing the at least one ink decal to the printable surface of the ink protecting printable layer further comprises applying the ink decal to at least one predetermined segment of the printable surface of the ink protecting printable surface.

13. A weight plate comprising:

a first side and an opposed second side;

a recessed surface defined within at least one of the first side and the second side, wherein the recessed surface extends between shoulders defined within at least one of the first side and the second side, wherein the shoulders descend below an exterior surface of the at least one of the first side and the second side of the weight plate to surround and thereby define the recessed surface;

a decorative decal assembly disposed on the weight plate comprising:

an adhesive layer having a contact surface and an opposed support surface, wherein the contact surface is in contact with the recessed surface;

an ink protecting printable layer having a printable surface secured to the support surface of the adhesive layer, and having an opposed outer protective surface;

at least one ink decal secured to the printable surface of the ink protecting printable layer and in contact with the support surface of the adhesive layer;

wherein the recessed surface defines a display area surrounded on all sides by an expansion zone extending between the display area and the shoulders of the weight plate that define the recessed surface, and wherein the expansion zone extends between perimeter edges of the display area and the shoulders a sufficient distance to permit limited expansion of perimeter edges of the decal assembly into the expansion zone without contacting the shoulders defining the recessed surface whenever the compressible weight plate experiences a bounce shock; and wherein the adhesive layer completely overlies the display area of the recessed surface, and wherein the ink protecting printable layer of the decal assembly also completely overlies the display area of the recessed surface.

* * * * *